July 23, 1957  J. G. O'NEIL  2,800,267
RUPTURABLE CONTAINER
Filed March 9, 1953

INVENTOR.
JOHN G. O'NEIL
BY Chas. C. Reif
ATTORNEY

United States Patent Office 2,800,267
Patented July 23, 1957

2,800,267

RUPTURABLE CONTAINER

John G. O'Neil, Minneapolis, Minn., assignor to Weinon, Incorporated, St. Paul, Minn., a corporation of Minnesota Application March 9, 1953, Serial No. 341,209

2 Claims. (Cl. 229—51)

This invention relates to a container and a method for making and opening said container. It is desirable to have a method and structure whereby a sealed container may be opened in a simple and easy manner without the need of using any tools or implements. It is particularly desirable to have such a method and structure for completely opening such a container.

It is an object of this invention to provide a structure of sealed container comprising means for simply and easily opening said container.

It is further an object of this invention to provide a structure of a container having closed ends and being formed of a sheet of material having a line of indentation which may comprise a crease, a line of spaced creases or a line of perforations extending helically thereabout substantially from top to bottom of said cylinder whereby the wall of said container may be depressed adjacent a portion of said line intermediate the ends of said container to break open said wall adjacent said line and said container may then be twisted at its end portions to cause said container to open along said line.

It is another object of this invention to provide a structure of a container having closed ends and being formed of a member of sheet material substantially rectangular in plan and having an inner layer with a line of indentations or which may comprise a crease, a line of spaced creases or a line of perforations extending substantially diagonally thereacross and having an outer layer of imperforate material whereby the wall of said container may be depressed adjacent a portion of said line intermediate the ends of said container to break open said wall, and the ends of said cylinder may then be twisted to cause said container to become completely opened along said line.

It is still another object of this invention to provide a structure of a container having closed ends and being formed of a member of sheet material generally rectangular in plan and having a central layer with a line of indentations which may comprise a crease, a line of spaced creases or a line of perforations extending substantially diagonally thereacross and having outer layers of imperforate material whereby the wall of said container may be depressed adjacent a portion of said line intermediate the ends of said container to break open said wall and the ends of said container may then be twisted to cause said container to completely open the same along said line.

These and other objects and advantages of the invention will be fully set forth in the following description made in connection with the accompanying drawings in which like reference characters refer to similar parts throughout the several views and in which.

Figure 1:
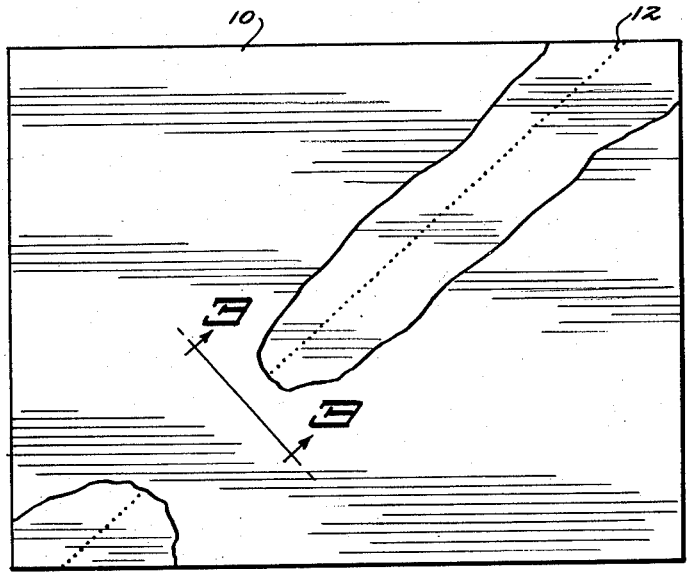
Fig. 1 is a plan view of applicant's device in open position with some parts broken away and some parts shown in dotted line.
Figure 2:
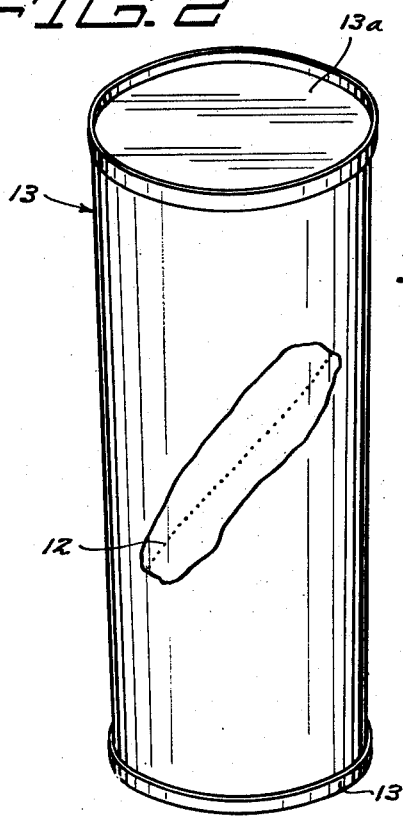
Fig. 2 is a perspective view of applicant's device in operating position with a portion broken away and a portion shown in dotted line.
Figure 3:
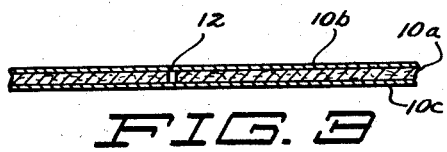
Fig. 3 is a view taken on line 3—3 of Fig. 1 as indicated by the arrows.
Figure 4:
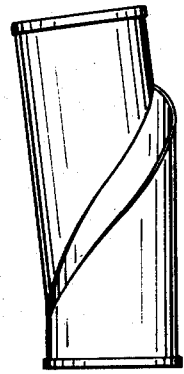
Fig. 4 is a view of applicant's device showing his container in a partially opened condition.
Figure 5:
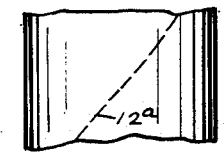
Fig. 5 is a partial view of applicant's device showing a portion of it in modified form.
Figure 6:
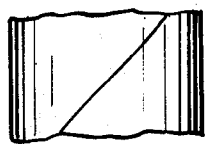
Fig. 6 is a partial view of applicant's device showing a portion of it in modified form.

Referring to the drawings, a sheet of material 10 is shown. Said member 10 is shown as being generally rectangular in plan and said member may be formed of any suitable material, such as heavy or strong paper, light cardboard or metal. As here disclosed, said member 10 is shown as having an inner layer 10a preferably of paper or cardboard, and outer layers 10b and 10c preferably of metal foil, such as aluminum or tin foil, etc. Said inner layer is shown as having a line of indentation 12 extending substantially diagonally thereacross. Said layers 10b and 10c are shown as being made of imperforate material and it has been found that aluminum foil or thin sheets of aluminum material are very satisfactory in forming said outer layers. Preferably said outer layers are bonded or secured to said inner layer in any suitable manner, as by a cement or other adhesive, to make a substantially unitary member of sheet material. A preferred embodiment of applicant's invention is here shown. The line of indentation may be formed as a crease as shown in Fig. 6, a line of spaced creases as shown in Fig. 5, or a line of perforations as shown in Figs. 1 and 2 and said line of indentation is shown as extending substantially diagonally across said inner layer 10a. Said member 10 may also be formed of a single layer of material having a line of indentation such as a crease or spaced creases thereacross or it may be formed of a member of sheet material having an inner layer having a line of indentation such as a crease, spaced creases or a line of perforations substantially diagonally thereacross and having an outer layer of imperforate material.

With reference to Fig. 2, said member 10 is shown formed into a cylinder 13 having members 13a and 13b enclosing its ends. It has been found very satisfactory to make said end portions of aluminum sheet material. Said end members may be secured to said cylinder 13 in any suitable manner, as by crimping, heat sealing with or without suitable cement or adhesive.

In operation, applicant's device will be formed as shown in Fig. 2, and said container shown in one embodiment as a cylinder will be filled with material. In opening said container, the operator will depress a portion of said line of indentation 12 intermediate the ends of said container to break open or rupture the wall of said container adjacent said line of indentations. This can readily be done by pressure of the thumb nail or a finger nail of the operator. The ends of said container will then be held respectively in the hands of said operator and the container twisted whereby said cylinder will readily and quickly open along said line of indentation. Without the rupturing of the container wall the container cannot be opened by twisting even with much pressure. It will be seen that in the closed container the central portion of the row 12 of perforations is at the opposite side of said container from the side having the connected edges of sheet 10. This makes a strong construction. The wall of the container will be ruptured locally when pressure is exerted at a point along said line of perforations 12, the line of spaced creases 12a shown in Fig. 5 or the continuous crease shown in Fig. 6.

Thus it is seen that I have provided a sealed container having means by which it can be easily and readily opened. I provide a means for completely opening such a container in a very simple and easy manner. The container has been amply tested in actual practice and found to be very successful and efficient and commercial production is in process.

It will of course be understood that various changes may be made in the form, details, arrangement and proportions of the device and in the steps and sequence of steps of the method without departing from the scope of applicant's invention, which, generally stated, consists in a method and device capable of carrying out the objects above set forth, such as disclosed and defined in the appended claims.

What is claimed is:

1. A filled container having closed ends and a wall constituting a rectangular sheet having its opposite edge portions connected to form a cylinder, said sheet consisting of inner and outer relatively thin layers and an intermediate relatively thick layer, said intermediate layer having a row of perforations extending helically from one end of said container to the other end thereof, the ends of said row terminating at the same side of said container as the connected edges of said sheet, and the central portion of said row being substantially opposite the connected edges of said sheet, said sheet being rupturable by pressure at a local point thereon and said container then being in condition to be opened along said row by holding said container by its ends and twisting said container.

2. A filled container having closed ends and a wall constituting a rectangular sheet having its opposite edges connected to form a cylinder with said edges forming elements of said cylinder, said sheet consisting of inner and outer relatively thin layers of aluminum foil and an intermediate layer of cardboard of much greater thickness than said inner and outer layers, said intermediate layer only having a row of perforations extending helically from one end of said container to the other, the ends of said row terminating at the same side of said container as the connected edges of said sheet and the central portion of said row being substantially opposite said connected edges of said sheet, said sheet being rupturable by pressure applied locally at a point along said row, said container then being in condition to be completely opened along said row by holding the same at its ends and twisting said container.

References Cited in the file of this patent
UNITED STATES PATENTS

| | | |
|---|---|---|
| 1,070,958 | Harrington | Aug. 19, 1913 |
| 1,502,864 | Milligan | July 29, 1924 |
| 1,560,681 | Fisher | Nov. 10, 1925 |
| 1,714,121 | Barbieri | May 21, 1929 |
| 1,936,417 | Ware | Nov. 21, 1933 |
| 2,051,922 | Vogt | Aug. 25, 1936 |
| 2,051,923 | Vogt | Aug. 25, 1936 |
| 2,681,284 | Granes | June 15, 1954 |
| 2,695,847 | Fisher | Nov. 30, 1954 |